United States Patent [19]

Rose et al.

[11] Patent Number: 5,492,726
[45] Date of Patent: Feb. 20, 1996

[54] PLATINUM GROUP SILICIDE MODIFIED ALUMINIDE COATING PROCESS AND PRODUCTS

[75] Inventors: Bernard R. Rose, Gloucester; Patrick R. Lavery, N. Andover, both of Mass.

[73] Assignee: Walbar Inc., Peabody, Mass.

[21] Appl. No.: 382,874

[22] Filed: Feb. 3, 1995

Related U.S. Application Data

[63] Continuation of Ser. No. 155,617, Nov. 19, 1993, abandoned.

[51] Int. Cl.$^6$ ..................................................... C23C 16/00
[52] U.S. Cl. ...................... 427/252; 427/253; 427/376.8; 427/383.7; 427/404
[58] Field of Search ................................... 427/252, 253, 427/376.8, 383.7, 404; 205/257

[56] References Cited

U.S. PATENT DOCUMENTS

| | | | |
|---|---|---|---|
| 3,677,789 | 7/1972 | Bungardt et al. | 117/22 |
| 4,055,706 | 10/1977 | Galmiche et al. | 428/652 |
| 4,293,338 | 10/1981 | Rose et al. | 75/253 |
| 4,526,814 | 7/1985 | Shankar et al. | 427/253 |
| 4,528,215 | 7/1985 | Baldi et al. | 427/252 |

*Primary Examiner*—Benjamin Utech
*Attorney, Agent, or Firm*—Howard S. Reiter; Thomas L. Tully

[57] ABSTRACT

Process for producing novel coated nickel and/or cobalt superalloy bodies having increased resistance to oxidation, corrosion and thermal fatigue at high temperatures. The process comprises applying a thin layer of a platinum-group metal, siliciding and heating to an elevated temperature to diffuse and integrate the silicided platinum-group metal into the surface of the superalloy body. Then the superalloy body is exposed to a diffusion powder composition containing sources of aluminum or aluminum/chromium metals and heated in a hydrogen or inert gas atmosphere to an elevated temperature to codeposit and diffuse aluminum or aluminum and chromium into the silicided platinum-group metal-treated surface. Finally, the superalloy body is heated to its solvus temperature to form a ductile surface having an outer zone comprising a platinum-group metal aluminide, optionally ductilized by the solutioning therein of beta chromium. An inner stabilizing zone of silicon-rich phases is formed during said diffusion processes.

11 Claims, No Drawings

PLATINUM GROUP SILICIDE MODIFIED ALUMINIDE COATING PROCESS AND PRODUCTS

This is a continuation of application Ser. No. 08/155,617 filed on Nov. 19, 1993, now abandoned.

BACKGROUND OF THE INVENTION

1. Field of the Invention

The present invention relates to the coating of high temperature superalloys, such as high nickel- and high cobalt-superalloys to provide them with an improved protective outer layer which has increased and stabilized resistance to oxidation and corrosion when subjected to such atmospheres at high temperatures by virtue of increased ductility and stabilization of the Beta NiAl and Beta CoAl phases. An important use of such superalloys is for turbine blades in jet aircraft or power generation engines which perform at high temperatures and in corrosive and oxidizing atmospheres.

2. Discussion of the Prior Art

It is known to form protective coatings on the surface of metal superalloy components, such as turbine blades, using metals to form layers which are more resistant to corrosion and/or oxidation at high temperatures than is the base superalloy.

According to one such procedure, disclosed in U.S. Pat. No. 3,677,789 by Bungardt et al., the base superalloy is first coated with a thin layer of noble metal, such as platinum, and is then subjected to a high temperature aluminum diffusion treatment for several hours to form a protective layer diffused into and integrated with the base superalloy. The formed protective surface layer comprises platinum aluminide which has the disadvantages of being brittle, subject to craze cracking and has low impact strength.

Diffusion coating compositions and procedures for diffusing both aluminum and chromium into superalloy base metal components in a single step are known from U.S. Pat. No. 4,293,338 by Rose et al. Thus, the prepared superalloy base component is packed into a conventional diffusion-coating container together with a powdered cementation pack coating composition containing intermetallic $CO_2Al_9$ powder and chromium metal powder, heated to about 1925°–1975° F. for about three-four hours in a hydrogen gas atmosphere, removed and post-treated in a hydrogen, inert gas or vacuum atmosphere for about two hours at about 1950° F.–1975°. A codeposited diffusion layer of aluminum and chromium is thereby provided at the superalloy metal surface, but in the absence of any platinum group metal.

According to another known procedure, disclosed in U.S. Pat. No. 4,526,814 by Shankar et al., protective diffusion layers of a platinum group metal, chromium and aluminum are formed at the surface of superalloy base components in a multi-step process in which the superalloy base component is first coated with the platinum group metal, post-platinized at about 1900° F. for three hours to diffuse the platinum metal into the superalloy, then high temperature-chromized at 1950° F. for eight hours to form a diffusion layer of the platinum group metal and chromium into the superalloy. The platinized metal is then high temperature-aluminized at about 1400° F. for five hours, to form a diffusion layer of the platinum group metal, chromium and aluminum into the superalloy base surface. Next a post-coating diffusion treatment is done at 1975° F. for 2 to 4 hours. Such procedure is tedious and expensive because of the several steps including the post-platinizing heating step and the pre-aluminizing heating step. Also, in cases where low amounts of chromium are diffused into the protective layer, the layer is limited in effectiveness of protection to high temperature oxidation and high temperature hot corrosion application (2000° F.–1700° F.).

Previously, increased ductility in a platinum improved aluminide was achieved by beta chromium ductilization of a platinum group metal coated surface. This is known as RB582, and employs the methodology of chromium-aluminum deposition known as RB505 (U.S. Pat. No. 4,293,338), and is disclosed in commonly owned U.S. patent application Ser. No. 875,375 filed Apr. 29, 1992, now abandoned but refiled as Ser. No. 212,274, filed Mar. 14, 1994, pending. The RB582 process is an improved and simplified process compared to that taught by Shanker et al. in U.S. Pat. No. 4,526,814.

It is also known to codeposit small amounts of silicon, with aluminum and chromium, in order to regulate the amount of aluminum which deposits and thereby increase the amount of chromium which can deposit, thereby improving the stability of the deposit against penetration into the substrate. Reference is made to U.S. Pat. No. 4,055,706 (Galmiche et al) and U.S. Pat. No. 4,528,215 (Boldi et al).

SUMMARY OF THE INVENTION

The present invention relates to an improved process for the diffusion coating of metallic superalloy bodies or components with a silicon-modified platinum-group metal to form an outer zone comprising an aluminide of a platinum-group metal and a silicide modified platinum-group metal aluminide, or such an aluminide in a beta NiAl matrix, depending upon the substrate alloy or thermal cycle used, and then diffusion-coating the so-treated substrate with an aluminum or aluminum and chromium powder composition to codeposit and diffuse Al or Al/Cr into the platinum group silicon modified aluminide. The formed silicided ductile protective layer or zone substantially improves the high temperature stability of the superalloy bodies or components against corrosion, erosion and oxidation.

The novel process of the present invention comprises the steps of (a) depositing a uniform thin layer of platinum-group metal, preferably palladium, onto the surface of a high temperature-resistant superalloy body, such as a high-nickel or high-cobalt metal superalloy gas turbine blade; (b) applying a post-metallizing thermal cycle, integrated with a silicide application, to diffuse the platinum-group metal into the superalloy surface and improve the adherence or bond between the platinum-group metal layer and the substrate prior to further processing, (c) diffusion-coating said metallized surface at elevated temperatures with a composition containing aluminum, or aluminum with a predetermined amount of chromium, and (d) subjecting the platinum silicided diffusion coated superalloy body to a thermal treatment to produce a ductile protective layer comprising a matrix of silicided platinum-group metal aluminide having solutioned therein a predetermined minor amount of beta chromium, if added, and a matrix of beta NiAl containing a said platinum-group metal aluminide having solutioned herein a predetermined minor amount of beta chromium, if present in the diffusion coating process.

The present sequence of diffusion processes is an efficient method for significantly improving outer zone ductility and oxidation and corrosion resistance by virtue of platinum-group silicide modification of an aluminide or chromium-aluminide coating. As an example, the integration of the post platinum group metallizing-thermal cycle with siliciding has been found to enable the final diffusion coating product to achieve superior coating performance both mechanically and kinetically.

The present process is applicable to conventional high temperature superalloys which are commercially-available particularly for use in the jet turbine engine and power generation engine field. An example assortment of high nickel alloys are available from International Nickel Company under the designations IN-713 (12.5% chromium and 3% aluminum), IN-738 (16% chromium and 3% aluminum) and IN-792 (12.5% chromium and 3% aluminum). Other similar nickel superalloys are available under the designations René 80 (13.5% chromium and 3% aluminum), Mar-M 002 (9% chromium and 5.5% aluminum), and SRR-99 (8.5% chromium and 5% aluminum). René N-5, CPW 384/PWA 1480.

As another example an assortment of high cobalt alloys would be Mar-M-509, X-40, and ECY-768.

DETAILED DESCRIPTION OF THE INVENTION

The superalloy bodies or components which are treated according to the present invention are well known metal superalloys intended for high temperature performance, such as jet or industrial turbine components, particularly blades or vanes. Such alloys have a high content of nickel and/or of cobalt.

The first step of the present process involves depositing a uniform thin layer of a platinum-group metal, such as platinum, palladium or rhodium, onto the superalloy surfaces to be protected, using any desired coating procedure such as electroplating, chemical vapor deposition, or the like. Preferably, the superalloy surfaces are prepared to improve their receptivity for the coating and to exclude contaminants, such as by conventional chemical or electrolytic cleaning. The thickness of the platinum-group metal deposit generally is between about 1–30 microns, but preferably is between 5–12 microns.

Next, the platinum-group metal-coated superalloy is subjected to a post metallizing thermal cycle which may or may not be integrated with a siliciding treatment to between 1750 F. and 1900° F. preferably about 1875°±25° F. for about one hour, to condition the platinum group coating for simultaneous or sequential siliciding and aluminizing or chromium aluminizing. Another purpose of the aforementioned step is to verify the uniform adherence of the platinum group metallization. The choice of a temperature at about 1875 F. is dictated by the need to dilute the platinum-group metal into the substrate so that the lattice parameter of the formed intermetallic will accommodate both silicide and beta chromium, if applicable. The addition of silicon as applied to a platinum-group metal significantly improves oxidation resistance and therefore greatly lengthens coating life by stabilizing the source of protective alumina scale.

The platinum-group metallized and silicided superalloy body is then subjected to conventional diffusion coating with an aluminum or aluminum/chromium powder codeposition in a single step, using for an example, diffusion powder-pack compositions and procedures as disclosed in U.S. Pat. No. 4,293,338.

Finally, the aluminum or aluminum/chromium diffusion-coated, metallized and silicided superalloy body is subjected to a post-coating heat treatment in hydrogen at about 1925° F. to 2050° F. for about one-to-three hours to produce the desired microstructure comprising a ductile platinum-group silicided aluminide matrix optionally containing a solutioned beta chromium, often in the range of 3% to 7%. The powder-pack compositions useful according to the present invention emit both aluminum and chromium at elevated temperatures below about 2000° F. and are resistant to being immobilized at about 2000° F. whereby they remain flowable after being heated for 2 hours at the diffusion temperatures, i.e., 1925° F. to about 1975° F. The aluminum containing pack composition contains over 90% by weight of a particulate inert filler, such as calcined alumina, a small amount of halide carrier or activator such as ammonium fluoride, ammonium bifluoride or aluminum fluoride and a source of aluminum such as $CO_2Al_9$ or Al—Si intermetallic. The proportions of the metal source powders can be varied depending upon the composition of the base alloy and the properties desired. Higher aluminum contents produce greater oxidation resistance but increased brittleness; higher chromium contents produce greater hot corrosion resistance. Silicon added to aluminides or chromium aluminides improves both oxidation and corrosion resistance while lengthening coatings' life by the stabilization of both NiAl and beta CoAl phases. These aforementioned phases are the sources of the protective alumina scale which is the essence of a high temperature coating. Generally, the aluminum or source powder is present in an amount between about 1 to 15% by weight and the chromium source powder is present in an amount between about 2 and 6% by weight. Preferred powder compositions may contain 3% by weight of $CO_2Al_9$ and from about 2% by weight (low chromium) to about 5% by weight (high chromium) of chromium powder.

The diffusion process is conducted by inserting the platinum-group and silicided metal and thermally-cycled superalloy body or component into a diffusion powder box which is packed with the desired aluminum or aluminum/chromium source powder composition. The powder box is heated rapidly in a hydrogen gas atmosphere to a temperature of 1850° F.–1950° F. for one-to-two hours to generate the aluminum or aluminum/chromium vapors and simultaneously diffuse them and the silicided platinum-group metal into the superalloy surface. Thereafter, the treated superalloy body is removed from the diffusion powder box, brushed clean and subjected to a post-coating heating step in which it is heated in a vacuum for about two–three hours at the gamma prime solvus temperature of the substrate, generally between about 1925° F. and 2050° F. depending upon the particular substrate alloy, to produce the desired ductile surface of a silicided platinum-group metal aluminide which may contain from 3% to 6% by weight of dissolved beta chromium.

The following examples are given as illustrative and should not be interpreted as limiting.

EXAMPLE 1

Turbine blade workpieces, cast from a high-nickel, high-chrome alloy sold under the trade designation "IN-738" by the International Nickel Company, are degreased by exposure to trichloroethane solvent vapors. The area of the turbine blades to be subjected to the diffusion coating process are abrasively cleaned with $Al_2O_3$ grit (which passes a 120 mesh sieve but not a 220 mesh sieve). After this blasting process, the turbine blades are then electrolytic alkaline cleaned, electrolytic muriatic acid cleaned, rinsed in deionized water and then palladium plated in a bath consisting of:

0.5 grams/liter lactic acid 10.9 grams/liter ammonium chloride 2.0 grams/liter nickel chloride 230 grams/liter ammonium hydroxide 8.0 grams/liter palladium chloride The temperature of the bath was 110°–120° F. the pH was 7.5, the current density 8 amps./sq. ft. and the voltage 2.5 volts. The blades were plated for forty minutes under these conditions. Different thickness of the palladium coating can be deposited by altering the treatment times accordingly.

After being palladium coated, the parts were fixtured and thermally cycled at 1875±25 F. for one hour in an argon atmosphere over a pack formulation containing 15.0% silicon, 2.0% $NH_4Cl$ and 83.0% $Al_2O_3$. This step serves a two-folded purpose:

(1) to diffuse and integrate the palladium coating into the superalloy body, whilst verifying the palladium coating adherence and surface integrity;

(2) to treat the palladium coated superalloy body with a silicide metallization treatment.

Next, the palladium silicide turbine blades are inserted into a coating container, which has been prepared according to procedures known in the art, and packed in a coating powder formulation comprising:

| Constituents | % by weight |
| --- | --- |
| Calcined aluminum oxide (#100 mesh) | 94.5% |
| $Co_2Al_9$ (#325 mesh) | 3.0% |
| Chromium powder (#325 mesh) | 2.0% |
| Ammonium Fluoride | 0.5% |

This is designated as the RB-505A blend and has a high aluminum content for applications requiring high oxidation resistance.

Workpieces are placed in the coating container in spaced relation so that there is about a 0.75" gap between adjacent pieces.

The powder box is loaded into a retort which is provided with means to circulate gas therethrough, means to insert thermocouples thereinto for the remote reading of temperature therein and a sand seal to prevent the ingress of air thereto. After the retort is closed, it is purged with argon gas at a rate of about 7 volume changes per hour and then placed into a gas-fired pit furnace. Hydrogen gas is introduced into retort prior to heating said retort. Hydrogen gas is constantly fed into the retort at a rate of about 5 volume changes per hour as the temperature inside the retort was raised to 1900° F.±25° F., and held there for an hour and fifteen minutes. The retort was then withdrawn from the furnace, and the parts were unpacked from the furnace, and the parts were unpacked from the powder pack.

The coated nickel-base turbine blades were carefully cleaned with a stiff-bristled brush and compressed air. Thereupon, the part was inspected and washed for three minutes in warm water and dried.

The parts were then loaded in a clean retort not previously used for diffusion coating and heat treated in a vacuuo for 1 to 3 hours at 2050° F.±15° F. depending on the microstructure desired, and then aged at 1550° F. ±15° F. for 24 hours, also in a vacuuo.

After metallographic examination of a test piece so treated, an excellent diffusion coating of about 0.0040 inches in depth was achieved during this process.

A microhardness scan of the outer zone of the formed coating shows increased ductility compared to that of a conventional platinum-reinforced aluminide surface.

A platinum aluminide coating has an average Knoop Hardness Number (KHN) of about 954, compared to a typical KHN of about 502 for the metal superalloy per se. The present palladium silicide chromium aluminide coatings have a KHN of about 600 and are ductile.

EXAMPLE 2

Example 1 is repeated, but with a hollow turbine blade of single crystal René N-5 alloy which is a low chromium content alloy intended for use in a high temperature hot oxidation environment and which is palladium coated as in Example 1, with the following differences as noted.

| Example | 1 | 2 |
| --- | --- | --- |
| Palladium:Nickel Ratio | 80:20 | 90:10 |
| Thickness | 400–450 microns | 300–375 microns |

After the palladium-coating step, a post palladize thermal cycle at 1800°±15° F. for about 1 to 2 hours in vacuo is applied. This cycle contains a thermal arrest between 450° and 600° F. for 2 to 4 hours prior to raising furnace temperature to 1800±15 F. The purpose of this heat treatment is three fold: (1) to release entrapped hydrogen gas which had been evolved during the electroplating or electrocleaning; (2) to verify the adherence and surface integrity of the palladium metallization; and (3) to diffuse and integrate the palladium metallization into René N-5 superalloy body.

Next, an Above The Pack (ATP) vapor phase silicide is applied as follows: the palladium coated and diffused blades are fixtured in a coating box containing a pack mix consisting of 15.0% elemental silicon, 2.0% $NH_4Cl$, and 83.0% #100 mesh $Al_2O_3$ The coating box, containing blades and ATP silicide mix, is heated to 1875°±25° F. in a hydrogen atmosphere. It is held at this temperature for 1 hour.

Next, the cooling passages of these hollow blades are packed with a Cr—Al coating mix known as RB505E. This mix contains 10.0% $Co_2Al_9$, #325 mesh 1.0% Cr, #325 mesh 0.75% $NH_4F$ 88.25% $Al_2O_3$, #100 mesh The cooling holes at tip and root are taped shut to prevent egress of the mix. The roots of said René N-5 turbine blades are masked in conventional manner. The masked and internally packed blades are then packed into a coating box filled with an external Cr—Al pack mix known as RB505B containing:

3.0% $Co_2Al_9$ #325 mesh 4.0% Cr, #325 mesh 0.5% $NH_4F$ 92.5% Calcined $Al_2O_3$ #100 mesh The coating box, filled with the RB505B pack mix and containing palladium-silicide metallized and diffused blades which have been internally packed with a high activity Cr—Al mix, is then heated to 1900°±25° F. It is held within this range for 45 minutes to 90 minutes in a hydrogen atmosphere.

After unpacking and cleaning, the so-treated blades are diffused in vacuo at 1975±15 for 2 hours and then aged at 1550±25 for 16 hours, also in vacuuo.

Metallographic examination of a test piece, so treated, shows that an excellent diffusion coating of about 0.0035 inch in depth was achieved.

It is to be understood that the above described embodiments of the invention are illustrative only and that modifications throughout may occur to those skilled in the art. Accordingly, this invention is not to be regarded as limited to the embodiments disclosed herein but is to be limited as defined by the appended claims.

We claim:

1. Process for increasing oxidation and corrosion resistance of superalloy bodies while also increasing the ductility and improving the heat stability thereof comprising the steps of:

(a) applying to the surface of a nickel and/or cobalt superalloy body a layer comprising a platinum-group metal;

(b) heating the superalloy body to an elevated temperature in the presence of a silicon vapor phase to form, diffuse and integrate a platinum-group metal silicide into the surface of the metal superalloy to improve the adherence or bond between the platinum-group metal layer and the superalloy body;

(c) diffusion coating the silicided superalloy body with vapors of a diffusion powder composition containing sources of aluminum or aluminum-and-chromium metals, in a hydrogen or an inert gas atmosphere at an elevated temperature for a sufficient period of time to diffuse aluminum or aluminum-and-chromium into the surface of the metal superalloy body; and (d) heating the superalloy body to form thereon a ductile protective coating having oxidation resistance and corrosion resistance, comprising a ductile outer zone of an aluminide of said platinum-group metal and an inner stabilizing zone of silicided platinum-group metal comprising from 3% to 20% by weight of silicon.

2. Process according to claim 1 in which said platinum-group metal comprises palladium.

3. Process according to claim 1 in which said diffusion powder composition comprises a mixture of $Co_2Al_9$ powder and chromium metal powder.

4. Process according to claim 3 in which said diffusion powder composition contains from about 1% to 15% by weight of $Co_2Al_9$ powder and from about 2% to 6% by weight of chromium metal powder.

5. Process according to claim 1 in which step (a) comprises electroplating the surface of the superalloy body with a layer of said platinum-group metal having a thickness up to about 12 microns.

6. Process according to claim 1 in which the heating in step (b) is conducted at a temperature between 1750° F. and 1950° F.

7. Process according to claim 1 in which step (c) is conducted at a temperature between 1850° F. and 1950° F.

8. Process according to claim 1 in which step (d) is conducted at a temperature between 1925° F. and 2050° F.

9. Process according to claim 1 in which the silicided platinum-group metal aluminide of step (b) has solutioned therein from 3% to 6% by weight of chromium.

10. Process according to claim 1 in which said silicided platinum-group metal aluminide is present within a beta phase nickel aluminide matrix.

11. Process for increasing oxidation and corrosion resistance of superalloy bodies while also increasing the ductility and improving the heat stability thereof comprising the steps of:

(a) applying to the surface of a nickel and/or cobalt superalloy body a layer comprising palladium;

(b) heating the superalloy body in the presence of a silicon vapor phase to form, diffuse and integrate palladium silicide into the surface of the metal superalloy to improve the adherence or bond between the palladium layer and the superalloy body;

(c) diffusion coating the silicided superalloy body with vapors of a diffusion powder composition containing sources of aluminum or aluminum-and-chromium metals, in a hydrogen or an inert gas atmosphere at an elevated temperature for a sufficient period of time to diffuse aluminum or aluminum-and-chromium into the surface of the metal superalloy body, and (d) heating the superalloy body to form thereon a ductile protective coating having oxidation resistance and corrosion resistance, comprising a ductile outer zone of palladium aluminide and an inner stabilizing zone of silicided palladium comprising from 3% to 20% by weight of silicon.

* * * * *